(No Model.)
J. MARQUARDT.
WEIGHING APPARATUS.
No. 394,869. Patented Dec. 18, 1888.
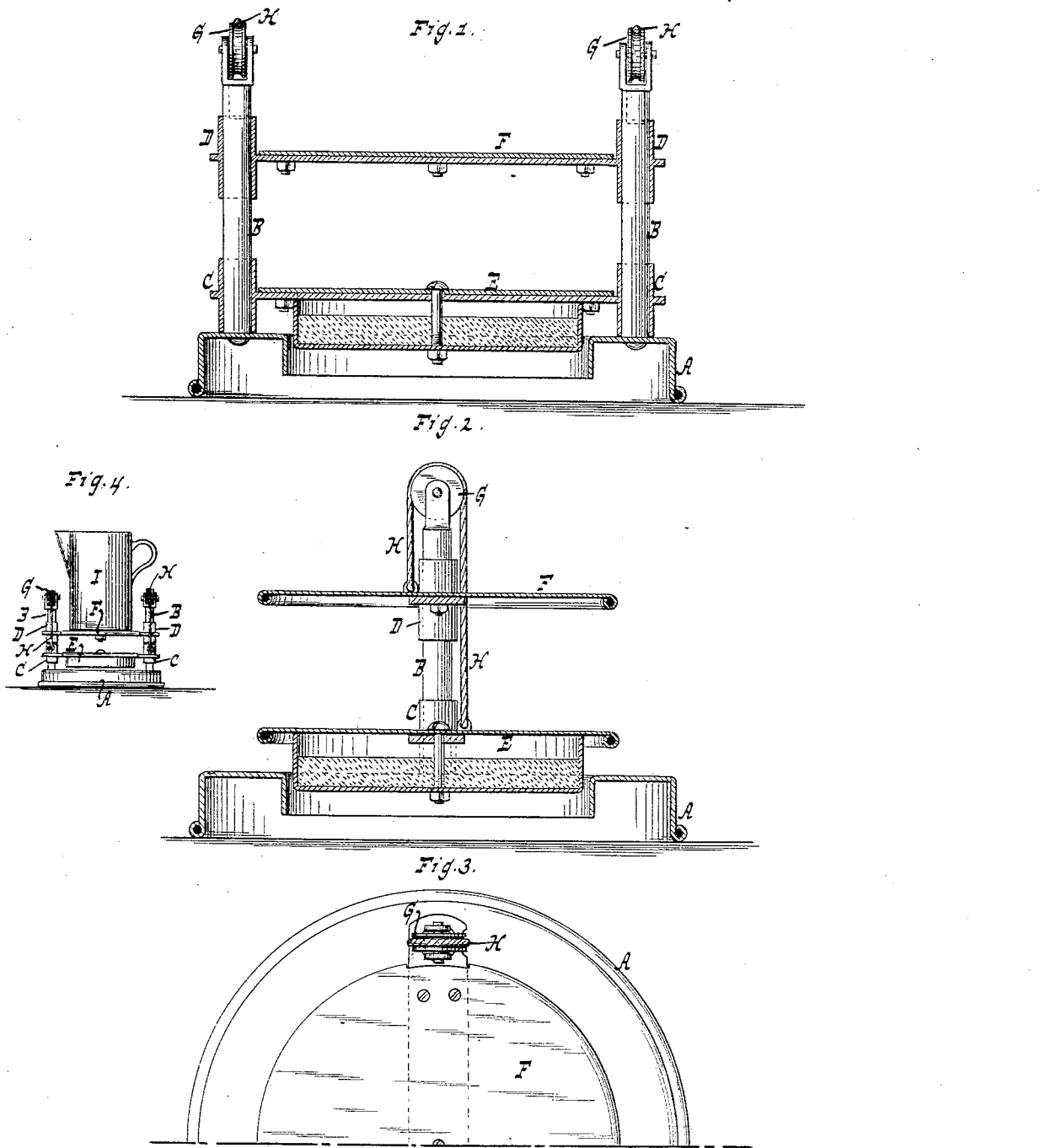
WITNESSES:
William M. Miller
Edward Wolff.
INVENTOR
Jacob Marquardt
BY Van Santvoord & Hauff
ATTORNEYS

United States Patent Office.

JACOB MARQUARDT, OF NEW YORK, N. Y.

WEIGHING APPARATUS.

SPECIFICATION forming part of Letters Patent No. 394,869, dated December 18, 1888.

Application filed August 9, 1888. Serial No. 282,313. (No model.)

*To all whom it may concern:*

Be it known that I, JACOB MARQUARDT, a citizen of the United States, residing at New York, in the county and State of New York, have invented new and useful Improvements in Weighing Apparatus, of which the following is a specification.

This invention relates to an improvement in weighing apparatus, as set forth in the following specification and claims and illustrated in the accompanying drawings, in which—

Figure 1 is a sectional front elevation of a weighing apparatus. Fig. 2 is a transverse section thereof. Fig. 3 is a plan view of part of the device. Fig. 4 shows the device on a smaller scale and in use.

Similar letters indicate corresponding parts.

In the drawings, the letter A indicates a base, having guides B. The sleeves C D are adapted to travel along the guides. To the sleeves C is secured a weight, E, and to the sleeves D a rest or platform, F. Over the guides or pulleys G travel cords or flexible connections H, connected to the platform and to the weight. When a sufficiently heavy article, I, is placed upon the platform F, so as to cause the platform to descend, the flexible connections H will move the weight E toward the platform F, as seen in Fig. 4.

The device will be found useful in measuring foaming liquids—such as certain carbonated beverages—the foam of which prevents or interferes with accurate observation of the measures. By placing the empty measure upon the platform and making the weight E of the proper heaviness and introducing liquid into the measure the reception of the proper amount of liquid will be indicated by the coming together of the platform and weight E or of their sleeves C D. As the sleeves come together with a certain degree of sound, an alarm or signal results, indicating that the proper degree of weight or amount of material rests upon the platform.

What I claim as new, and desire to secure by Letters Patent, is—

1. The combination of a base, A, upright guides B, rising from the base, a weight, E, sliding vertically on the guides, a platform, F, located above the weight and sliding vertically on the uprights, guides G, and flexible connections H, supported by the guides and connected with the weight and platform, substantially as described.

2. The combination, with a platform or support and a weight, of guides B, having pulleys G, sleeves C D, made to pass about said guides and secured to the platform and weight, and flexible connections passing over the pulleys and secured to said platform and weight, substantially as described.

In testimony whereof I have hereunto set my hand and seal in the presence of two subscribing witnesses.

JACOB MARQUARDT. [L. S.]

Witnesses:
W. C. HAUFF,
E. F. KASTENHUBER.